E. B. CROCKER.
PRESSURE GAGE.
APPLICATION FILED APR. 10, 1918.
1,375,366.
Patented Apr. 19, 1921.
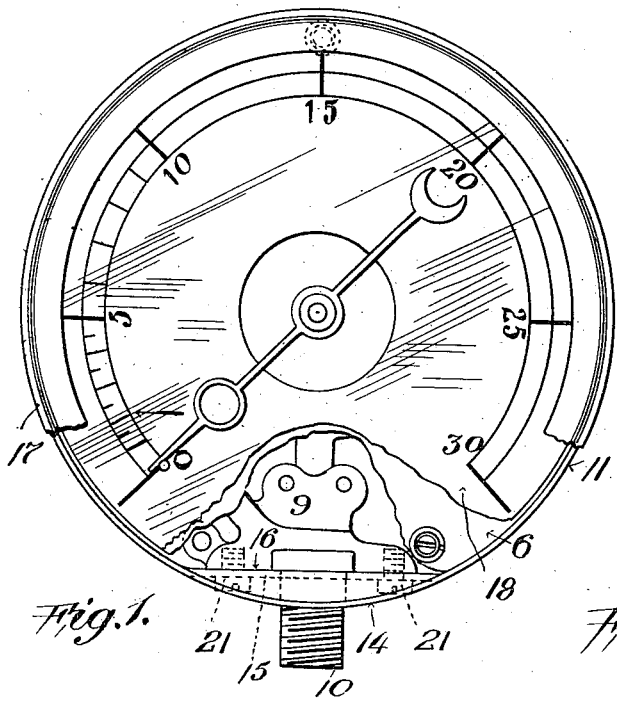
Fig. 1.
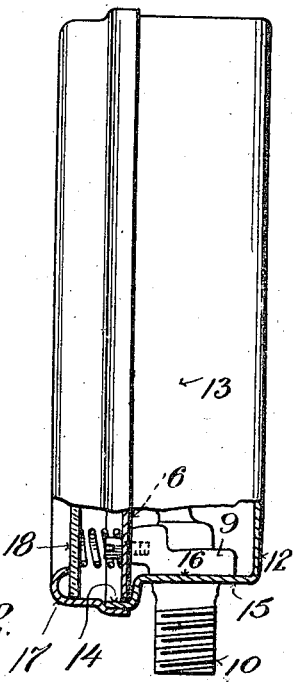
Fig. 2.
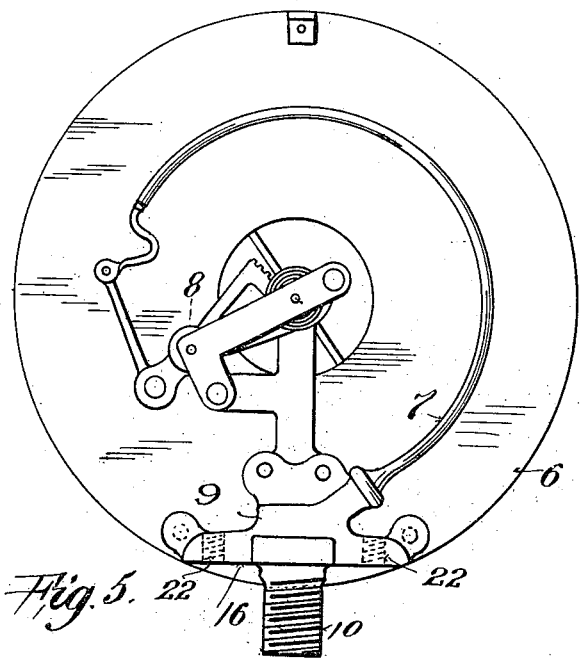
Fig. 5.
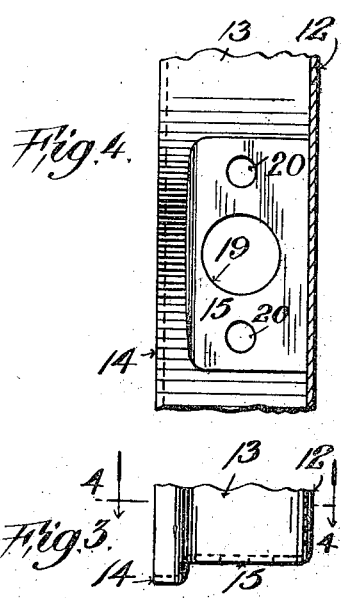
Fig. 4.
Fig. 3.
Inventor
Ernest B. Crocker
by his atty Samuel E. Darby

UNITED STATES PATENT OFFICE.

ERNEST B. CROCKER, OF BRIDGEPORT, CONNECTICUT, ASSIGNOR TO THE ASHCROFT MANUFACTURING COMPANY, OF BRIDGEPORT, CONNECTICUT, A CORPORATION OF CONNECTICUT.

PRESSURE-GAGE.

1,375,366.      Specification of Letters Patent.     Patented Apr. 19, 1921.

Application filed April 10, 1918. Serial No. 227,671.

*To all whom it may concern:*

Be it known that I, ERNEST B. CROCKER, a citizen of the United States, residing at Bridgeport, county of Fairfield, State of Connecticut, have made a certain new and useful Invention in Pressure-Gages, of which the following is a specification.

This invention relates to pressure gages, and particularly to drawn metal cases to receive the socket block of pressure gage movement units.

The object of the invention is to provide a drawn metal case to receive the movement structure of pressure gages, and having means to form an efficient seating for the socket piece of the gage movement.

A further object of the invention is to provide a drawn metal case for pressure gages which affords means for properly and efficiently seating the socket piece of an independent unit movement structure.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

In the accompanying drawing Figure 1 is a view in front elevation of a pressure gage showing a drawn metal inclosing case for the gage movement constructed in accordance with my invention to afford a seating for the socket piece of the movement, parts of the cover plate, glass and dial plate being broken out.

Fig. 2 is a view in side elevation of the same, parts broken out and parts in section.

Fig. 3 is a broken detail edge view of the drawn metal case showing the depression in the edge thereof to form the seating for the movement socket piece.

Fig. 4 is a broken detail view in section on the line 4, 4, Fig. 3, showing the seating for the socket piece.

Fig. 5 is a view similar to Fig. 1 showing the independent unit movement structure of the gage with its socket piece.

The same part is designated by the same reference numeral wherever it occurs throughout the several views.

In the manufacture of pressure gages it has been found desirable in practice to construct the gage movement as an independent unit to include the sensitive element of the gage, the dial, the pointer mechanism, and the socket piece by which connection is effected with the source of pressure to be indicated by the gage unit, such unit being independent of the case within which the movement is inclosed except for the seating within the case for the socket piece and through which the socket piece is secured within the case. Among the advantages attending the use of an independent unit movement for pressure gages, it is observed that the danger is avoided of displacing the hand or pointer with reference to the graduations of the dial plate in case of deformation of the inclosing case due to outside strains of abuse or misuse, accident, or the like. If the movement structure formed a part of or was intimately connected within the casing any blow or dent given to the casing in handling, packing, or shipping the same, or otherwise, might result in the derangement of the hand or pointer with reference to the graduations on the dial plate. The considerations of this nature have led to the adoption of an independent unit structure of gage movement, which, according to standard practice, is mounted within a suitable casing, the socket piece only of the movement being seated against and secured to the interior surface at a convenient point of the case. Where the case is of cast metal it is a comparatively easy matter to cast with the case a suitable flat surface or block at a convenient point on the interior surface of the peripheral portion of the case to afford a seating thereagainst of the socket piece of the movement with plane or flat bearing surfaces of the seating and the socket piece. The use of cast metal cases, however, involves the necessity for the use of heavier metal than is desirable in order to effect the casting thereof, and, moreover, cast metal cases are more or less easily fractured and are not capable of receiving desirable or attractive ornamentation, and besides cast metal cases are more or less expensive to manufacture. To overcome the objections attending the use of cast metal cases it is among the special purposes of my present invention to provide a drawn or pressed metal case for pressure gages. As pressure gages are customarily made cylindrical or cup shaped the difficulty in the way of manufacturing drawn or pressed metal cases lies in providing an efficient seating for the attachment to the interior surface of the rim of the case of the socket piece of the movement. Where the socket piece of the movement is required to conform to the curvature of the interior surface of the rim of the case difficulties are encountered in properly and efficiently shaping the bearing surface of the socket piece and in drilling therethrough the screw holes for the attaching screws by which the socket piece is attached to the case. Moreover, where curved seating surfaces are provided the further difficulty is encountered of effecting a desirable tight joint between the seating surfaces.

To overcome these and other objections heretofore encountered in the manufacture of cases for pressure gages I propose to construct a drawn or pressed metal case and to form a depressed seat in a portion of the cylindrical periphery of the case, such depressed portion being formed into a plane surface to afford a flat plane bearing surface on the interior of the case to receive the flat bearing portions of the socket piece. In forming the depressed plane socket piece seating in the drawn or pressed metal case I propose to leave the edge of the rim portion of the case intact. That is, when forming the depressed socket piece seating, I propose to confine the depression to a portion only of the transverse width of the peripheral portion of the case, leaving the rim portion thereof of circular outline so as to afford a continuous seating for the ring of the cover which retains the glass in place over the face of the gage.

In the accompanying drawing I have shown a drawn or pressed metal case structure for pressure gages embodying my invention, and the application thereto of an independent unit gage movement structure, the latter, shown in Fig. 5, including the dial plate 6, the sensitive element 7, the movement designated generally by reference numeral 8, and the socket piece 9, carrying these various parts, and also the nipple 10 for connection with the source of pressure to be indicated by the gage. The particular structure of movement and sensitive element employed forms no part of my present invention, nor does the manner of attachment of the dial plate to the socket piece. The case 11 is of drawn or pressed metal formed into cup shape, including the base 12, peripheral portion 13, and edge rim 14. A portion of the peripheral part 13 of the case is pressed into a plane surface or seating 15 to receive the corresponding plane or flat bearing surface 16 of the socket piece. The depression forming the seating 15 in the peripheral wall of the case extends only part way across the transverse dimension of the peripheral portion 13 of the case thereby leaving the adjacent edge or rim 14 of circular shape. That is, the depressed seat is formed without disturbing the circular contour of the edge portion 14 of the case, thereby affording a continuous circular edge for the case to receive the retaining ring 17 of the glass plate 18 which covers the face of the dial plate 6. The wall of the peripheral portion 13 of the case at the depressed or flat seating 15 formed therein is perforated as at 19 to receive therethrough the nipple 10 of the movement. This flattened seat is also perforated as at 20 receive the fastening screws indicated at 21 by which the socket piece 9 is attached to the case.

By this construction it will be seen I provide a flat seating or bearing surface 15 on the interior peripheral portion of the casing against which seats the flat or plane bearing surface 16 of the socket piece of the movement. Consequently I avoid complications and objections in the manufacture of curved bearing surfaces for these seatings. The screw holes 22 in the socket piece are not formed radially with reference to the center of the case and therefore I avoid the necessity for employing angularly disposed tapping tools in forming the holes 22. I also avoid forming angularly disposed punches for punching the holes 20 in the casing. I also avoid forming a curved surface for a seating surface on the socket piece which is difficult of accomplishment and unsatisfactory in use. I also provide a continuous circular engagement of the retaining ring 17 with the case and thereby avoid unnecessary gaps or openings for admission of dust, dirt, or the like, to the movement. By providing plane flat bearing surfaces for the seating of the socket piece I avoid the necessity for using a packing for the joint. I also provide a drawn or pressed metal case instead of a cast metal case thereby securing a lighter, stronger, and more durable case, at less expense of manufacture and which is capable of receiving any desired ornamentation, and a structure which presents less difficulty and complication and expense in manufacturing and assembling the parts, and at the same time affording a drawn or pressed metal case in which the unit movement structure and socket piece thereof is readily and easily interchangeable for use with cast metal cases.

Having now set forth the objects and nature of my invention, and a construction embodying the principles thereof, what I claim as new and useful and of my own invention, and desire to secure by Letters Patent, is:—

1. In a pressure gage, the combination with a dial and pointer mechanism and sensitive element associated therewith, and a socket piece having a plane flat seating surface, of a drawn or pressed metal inclosing case of circular contour having a portion of its peripheral wall depressed to form a flat bearing surface to receive the flat bearing surface of the socket piece, and means for attaching the socket piece to its seating.

2. A drawn or pressed sheet metal case for pressure gages, of circular contour, and having a portion of the peripheral wall thereof depressed inwardly to form a flat seating, in combination with a gage movement including a socket piece having a corresponding flat seating surface to seat against said case seating, and means for securing said socket piece to said seating.

3. A drawn or pressed steel metal case for pressure gages of circular contour having a continuously cylindrical edge and formed with a depressed portion in the peripheral wall thereof to provide a plane flat seating, in combination with a gage movement including a socket piece having a corresponding plane flat bearing surface to be received against said seating, and means for securing said socket piece to said seating.

4. A drawn or pressed metal case for pressure gages of cylindrical contour and having a portion of its peripheral wall depressed to form a plane flat seating, said depressed portion being perforated, in combination with a gage movement including a socket piece and a nipple, said socket piece having a plane flat bearing surface to seat against said seating, said nipple extending through the perforation in said seating, and means for securing the socket piece to its seating.

In testimony whereof I have hereunto set my hand on this 3rd day of April A. D., 1918.

ERNEST B. CROCKER.